(No Model.)
G. F. SIMONDS.
BALL BEARING.
No. 434,481. Patented Aug. 19, 1890.
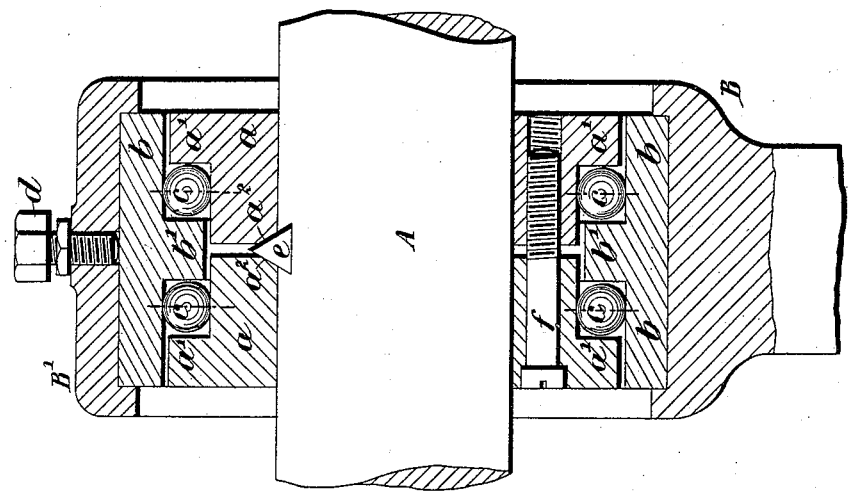
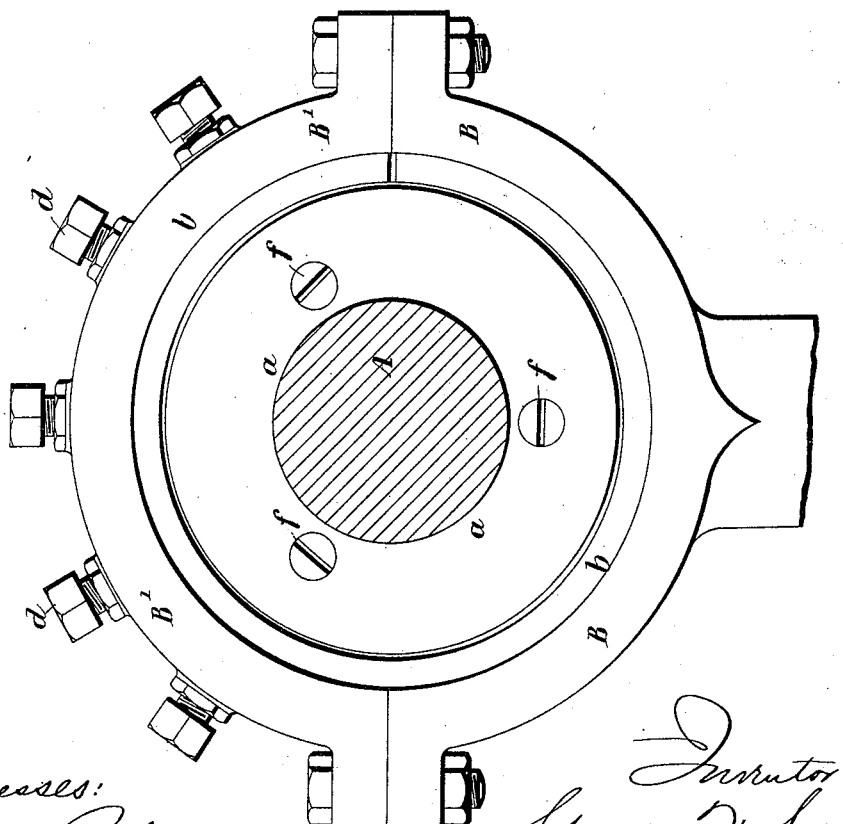
Witnesses:
J. A. Rutherford
Percy B. Hill
Inventor:
George F. Simonds
By James L. Norris.
Attorney.

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,481, dated August 19, 1890.

Application filed January 16, 1890. Serial No. 337,119. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to bearings in which spherical rollers or balls for diminishing the friction are arranged between concentric surfaces on the oscillating or rotating part and on the non-oscillating or non-rotating part, or on inner and outer rings or annular pieces fitted thereon.

One object of my said invention is to construct bearings of this kind or class which can be advantageously employed for forming the joints between the connecting-rods and the piston-rods or crank-pins of engines. My improvements are, however, applicable to bearings for shafts and other oscillating or rotating parts of machinery.

My said invention comprises the combination of inner and outer rings or annular pieces concentric with each other, between which are arranged one or more circular series or groups of balls, and one or more of which are adjustable relatively to the other to compensate for wear of the parts, and thus prevent any "knock" or "hammering" in the bearing by reason of slackness or play of the joint-pin, shaft, or the like therein.

My said invention also comprises the combination, with the said rings or annular pieces, of means for securing the inner rings upon the joint-pin, shaft, or the like when two or more of such rings are used in the bearing.

In the accompanying drawings, Figure 1 is a side elevation, partly in transverse section; and Fig. 2, a vertical longitudinal central section illustrating a bearing constructed according to my said invention and suitable for a joint for coupling a connecting-rod with a crank-pin or with a piston-rod or cross-head.

A is the crank-pin or joint-pin.

B is the head or end of the connecting-rod, and B' is the cap thereof.

$a\ a$ are complete rings or annular pieces fitted upon the crank-pin or joint-pin A, and each provided with a circumferential projection, rib, or flange $a'$.

$b$ is a split or divided or incomplete ring or annular piece concentric with the rings $a$ and provided with a circumferential projection rib or collar $b'$.

$c\ c$ are the balls, which are arranged in circular series or groups between the said rib or collar $b'$ and the ribs or flanges $a'$.

$d\ d$ are screws whereby the said incomplete ring $b$ may be adjusted relatively to the rings $a$ to compensate for wear of the bearing-surfaces or of the balls, or of both the bearing-surfaces and the balls.

$e$ is a short metal bar or key, of triangular or other suitable shape, in transverse section, which is fitted in a transverse slot or groove in the crank-pin or joint-pin A. The rings or annular pieces $a$ are provided with notches or recesses $a^2$, so that when the said rings or annular pieces are fitted upon the crank-pin or joint-pin A—one on each side of the said key—the latter will fit into the said notches or recesses. The said rings or annular pieces are then connected and held firmly in place by screws $f$, passing through one of the said rings and screwed into the other ring, or in any other convenient manner.

It is obvious that the improvements hereinbefore mentioned are applicable to various forms of bearings for oscillating or rotating parts of machinery.

Certain features of construction shown and described, but not claimed in this application, are shown, described, and claimed in applications filed by me, Serial Nos. 331,639 and 336,700.

What I claim is—

1. A ball-bearing comprising concentric rings or annular pieces, one of which is split or divided or incomplete and is adjustable relatively to another, and balls arranged between concentric bearing-surfaces on the said rings or annular pieces, for the purposes above specified.

2. In a ball-bearing, the combination of a complete ring or annular piece, a split or incomplete ring or annular piece concentric therewith, balls arranged between concentric bearing-surfaces on the said rings, and screws for adjusting the split or incomplete ring relatively to the complete ring, substantially as and for the purposes set forth.

3. In a ball-bearing, the combination of complete rings or annular pieces $a$, each provided with a circumferential projection, rib, or flange $a'$, a split or divided or incomplete ring or annular piece $b$ concentric with the said complete rings and adjustable relatively thereto and having a circumferential projection, rib, or collar $b'$, and balls $c$, arranged in circular series or groups between the ribs or flanges $a'$ and the rib or collar $b'$, substantially as and for the purposes set forth.

4. In a ball-bearing, the combination of complete rings or annular pieces $a$, each provided with a circumferential projection, rib, or flange $a'$, a split or divided or incomplete ring or annular piece $b$ concentric with the said complete rings and provided with a circumferential projection, rib, or collar $b'$, screws $d$, for adjusting the said incomplete ring relatively to the complete rings, and balls $c$, arranged in circular series or groups between the said ribs or flanges $a'$ and the said rib or collar $b'$, substantially as and for the purposes set forth.

5. In a ball-bearing, the combination, with the pin or shaft A, of complete rings or annular pieces $a$, each provided with a circumferential projection, rib, or flange $a'$, and with a notch or recess $a^2$, a key $e$, fitted in a transverse slot or groove in the said pin or shaft, screws $f$, for securing the said rings in place and retaining them in engagement with the said key, a split or divided or incomplete ring or annular piece $b$ concentric with the said complete rings and provided with a circumferential projection, rib, or collar $b'$, screws $d$, for adjusting the said incomplete ring relatively to the complete rings, and balls $c$, arranged in circular series or groups between the said ribs or flanges $a'$ and the said rib or collar $b'$, substantially as and for the purposes set forth.

In testimony whereof I have hereunto signed my name in the presence of two subscribing witnesses.

GEORGE FREDERICK SIMONDS.

Witnesses:
DAVID YOUNG,
CHAS. B. BURDON.